(12) United States Patent
Huguenard

(10) Patent No.: US 12,320,553 B1
(45) Date of Patent: Jun. 3, 2025

(54) STORAGE SHED WITH INTEGRATED SOLAR ROOF

(71) Applicant: Kevin Huguenard, Englewood, FL (US)

(72) Inventor: Kevin Huguenard, Englewood, FL (US)

( * ) Notice: Subject to any disclaimer, the term of this patent is extended or adjusted under 35 U.S.C. 154(b) by 497 days.

(21) Appl. No.: 17/867,815

(22) Filed: Jul. 19, 2022

(51) Int. Cl.
*F24S 20/67* (2018.01)
*E04H 1/12* (2006.01)

(52) U.S. Cl.
CPC ............. *F24S 20/67* (2018.05); *E04H 1/12* (2013.01)

(58) Field of Classification Search
CPC .................................. E04H 1/12; F24S 20/67
USPC .......................................................... 52/173
See application file for complete search history.

(56) References Cited

U.S. PATENT DOCUMENTS

| | | | |
|---|---|---|---|
| 5,090,167 A | 2/1992 | Wassell | |
| 5,259,363 A * | 11/1993 | Peacock | F24S 20/67 126/621 |
| 6,341,454 B1 | 1/2002 | Koleoglou | |
| D631,824 S | 2/2011 | Tanaka | |
| 10,081,944 B1 * | 9/2018 | Staton | E04D 13/064 |
| 10,222,119 B2 | 3/2019 | Rezayat | |
| 10,373,085 B1 * | 8/2019 | Baghdikian | G06Q 30/0208 |
| 10,697,947 B1 * | 6/2020 | Armitage | H02S 40/30 |
| 2007/0131222 A1 * | 6/2007 | Gorsuch | F24S 10/70 126/658 |
| 2007/0131223 A1 * | 6/2007 | Gorsuch | F24V 50/00 126/675 |
| 2008/0141999 A1 * | 6/2008 | Hanken | F24S 20/67 126/621 |
| 2013/0199516 A1 | 3/2013 | Snyder | |
| 2014/0202092 A1 | 7/2014 | Bostic | |
| 2014/0260396 A1 | 9/2014 | Dale | |
| 2021/0018184 A1 * | 1/2021 | Hokanson | F24S 20/67 |
| 2021/0211086 A1 | 7/2021 | Schwarze | |

FOREIGN PATENT DOCUMENTS

WO 2017087160 5/2017

* cited by examiner

*Primary Examiner* — James J Buckle, Jr.
(74) *Attorney, Agent, or Firm* — Kyle A. Fletcher, Esq.

(57) ABSTRACT

The shed with integrated solar roof is a prefabricated building. The shed with integrated solar roof is an alternative electric power source. The shed with integrated solar roof is configured for use with a primary building. The primary building further comprises a primary building load. The primary building load is the requirement for the amount of electric energy necessary to support the operation of the electrically powered devices in the primary building. The shed with integrated solar roof provides electric energy comprises a shed structure and a power circuit. The shed structure forms a shed protected space that contains the power circuit. The power circuit is an electric circuit. The power circuit provides the electric energy necessary to support the primary building load.

12 Claims, 4 Drawing Sheets

STORAGE SHED WITH INTEGRATED SOLAR ROOF

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of prefabricated buildings that are coordinated with other buildings. (E04H1/00)

SUMMARY OF INVENTION

The shed with integrated solar roof is a prefabricated building. The shed with integrated solar roof is an alternative electric power source. The shed with integrated solar roof is configured for use with a primary building. The primary building further comprises a primary building load. The primary building load is the requirement for the amount of electric energy necessary to support the operation of the electrically powered devices in the primary building. The shed with integrated solar roof provides electric energy comprises a shed structure and a power circuit. The shed structure forms a shed protected space that contains the power circuit. The power circuit is an electric circuit. The power circuit provides the electric energy necessary to support the primary building load.

These together with additional objects, features and advantages of the shed with integrated solar roof will be readily apparent to those of ordinary skill in the art upon reading the following detailed description of the presently preferred, but nonetheless illustrative, embodiments when taken in conjunction with the accompanying drawings.

In this respect, before explaining the current embodiments of the shed with integrated solar roof in detail, it is to be understood that the shed with integrated solar roof is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the shed with integrated solar roof.

It is therefore important that the claims be regarded as including such equivalent construction insofar as they do not depart from the spirit and scope of the shed with integrated solar roof. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
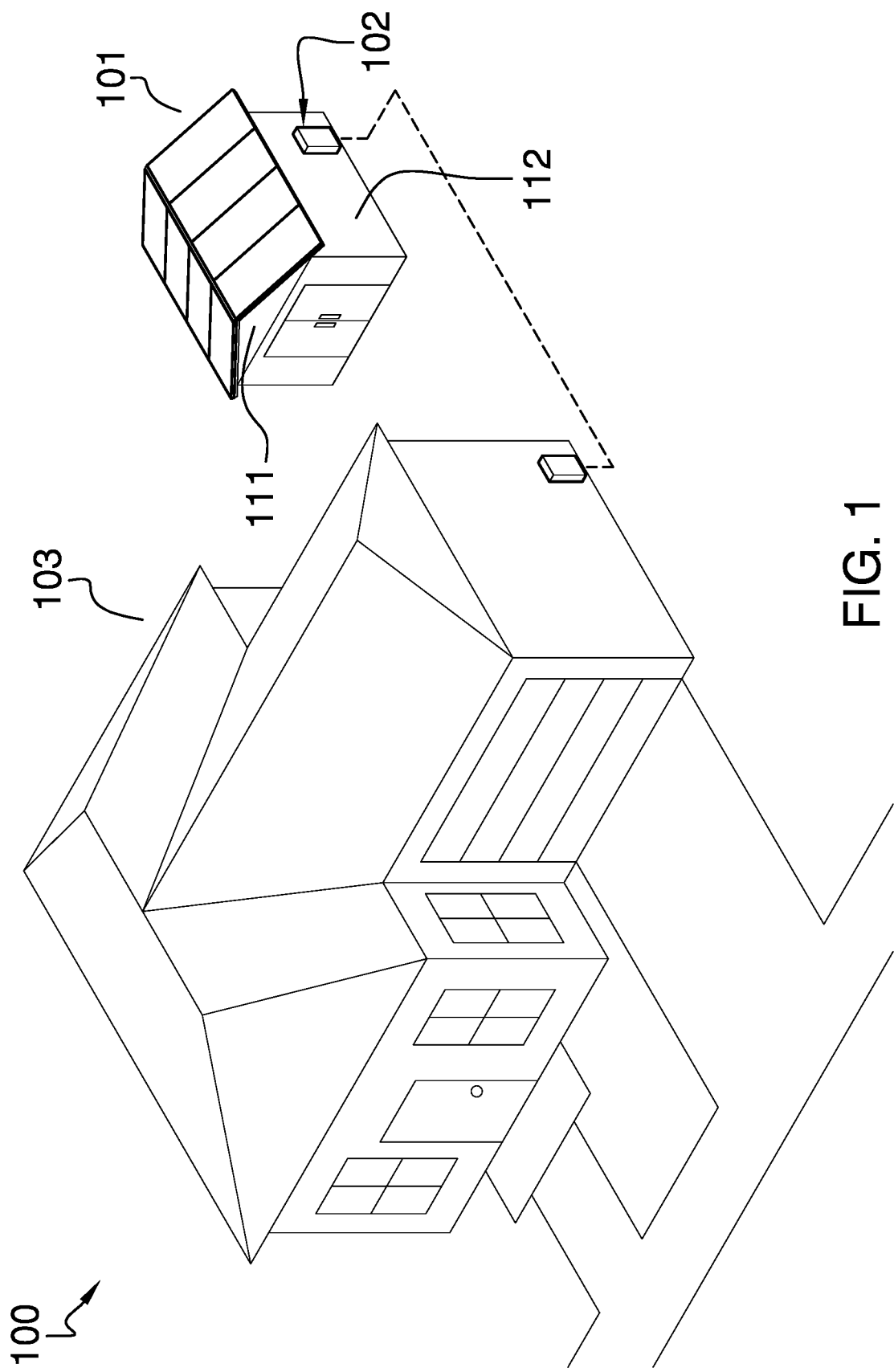
FIG. 1 is a perspective view of an embodiment of the disclosure.
Figure 2:
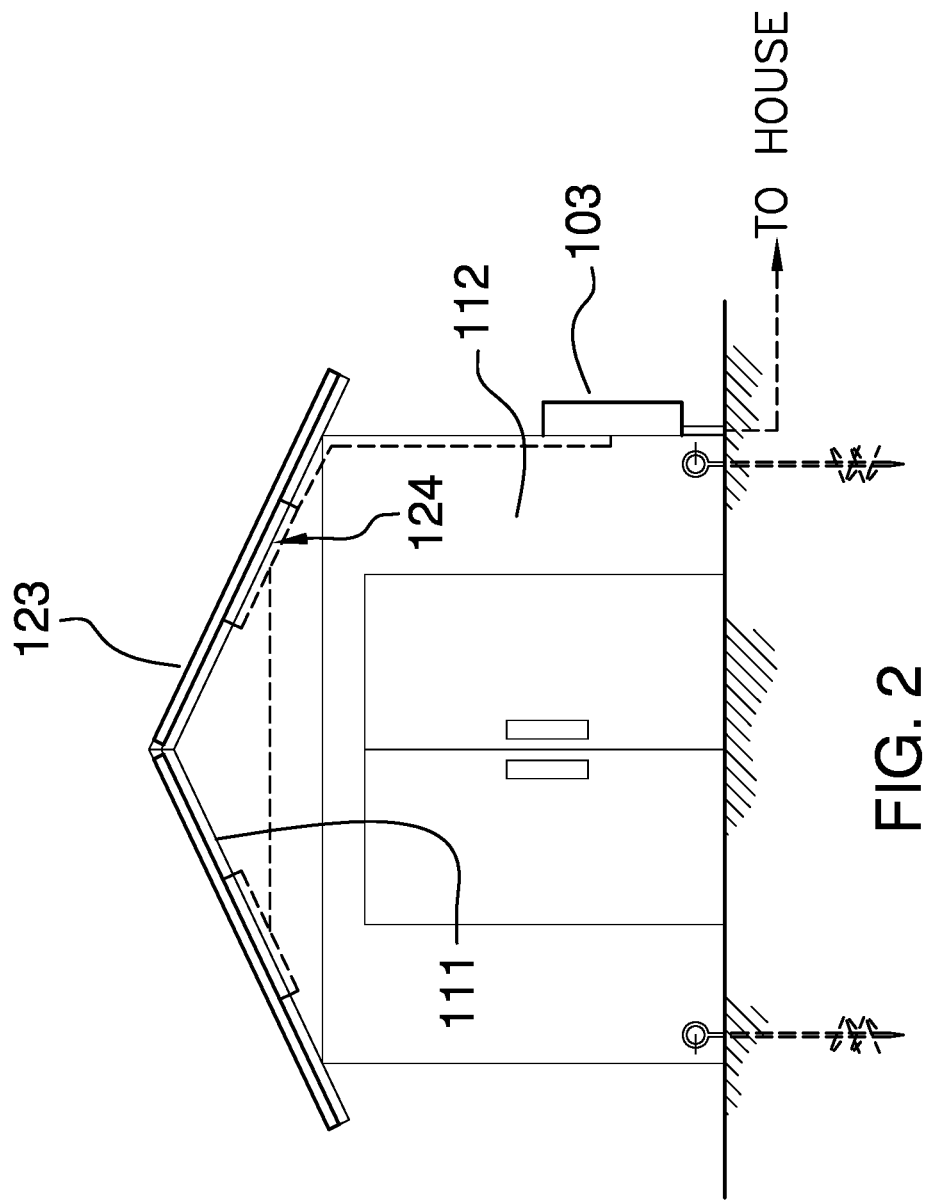
FIG. 2 is a front view of an embodiment of the disclosure.
Figure 3:
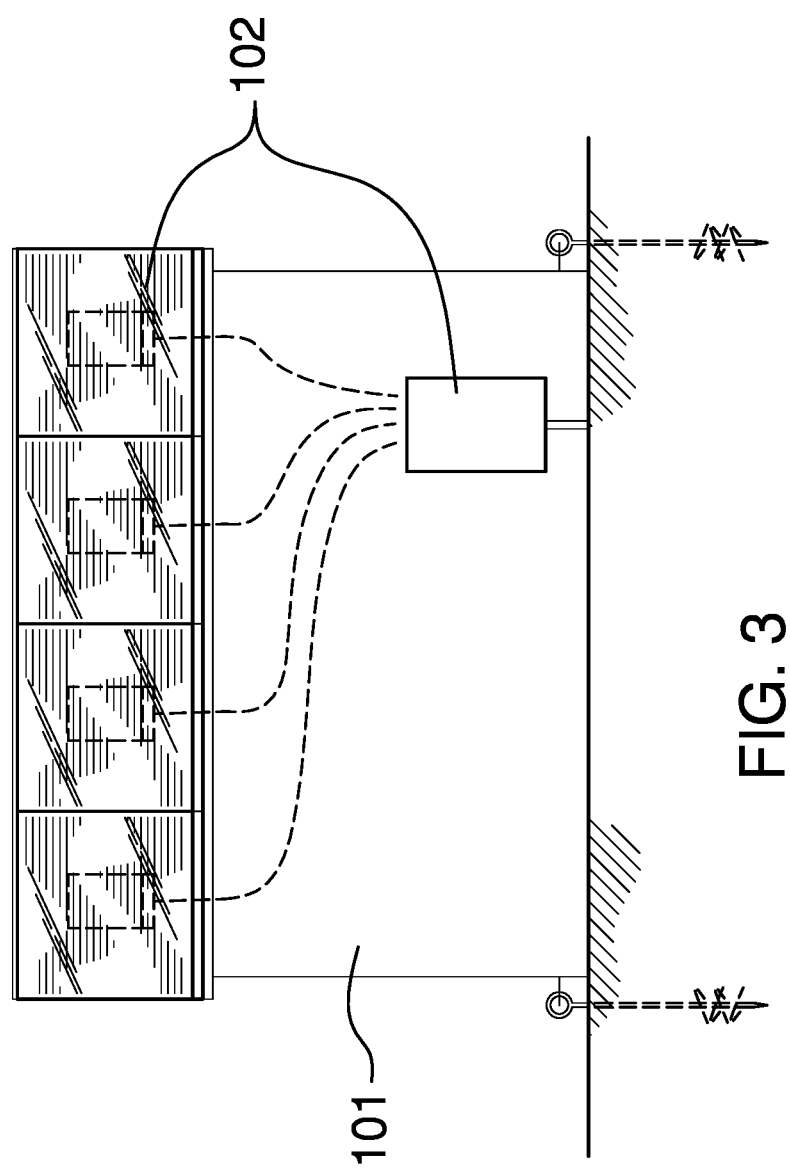
FIG. 3 is a side view of an embodiment of the disclosure.
Figure 4:
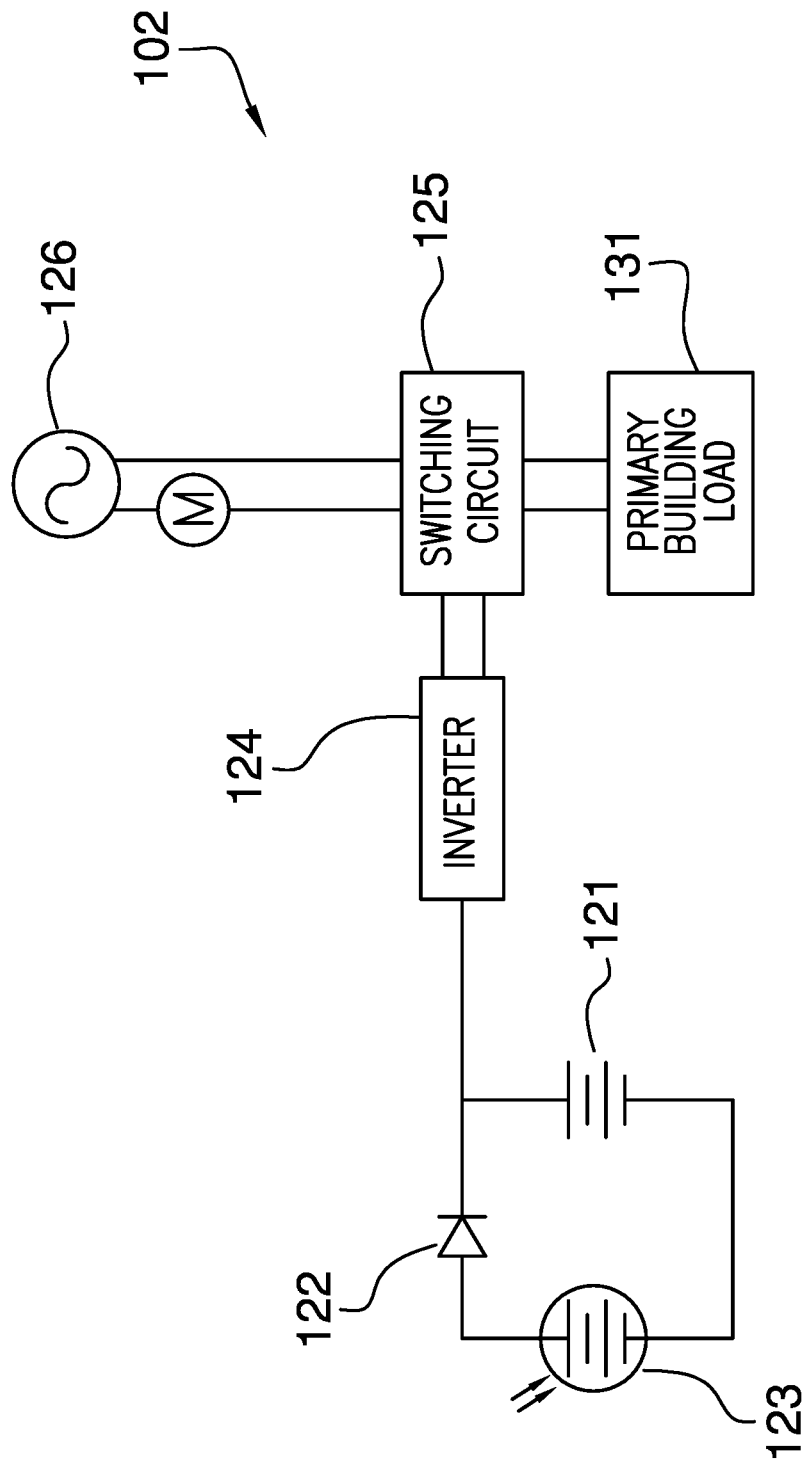
FIG. 4 is a block diagram or schematic view of an embodiment of the disclosure.

Detailed reference will now be made to one or more potential embodiments of the disclosure, which are illustrated in FIGS. 1 through 4.

The shed with integrated solar roof 100 (hereinafter invention) is a prefabricated building. The invention 100 is an alternative electric power source. The invention 100 is configured for use with a primary building 103. The primary building 103 further comprises a primary building 103 load 131. The primary building 103 load 131 is the requirement for the amount of electric energy necessary to support the operation of the electrically powered devices in the primary building 103. The invention 100 provides electric energy comprises a shed structure 101 and a power circuit 102. The shed structure 101 forms a shed protected space 112 that contains the power circuit 102. The power circuit 102 is an electric circuit. The power circuit 102 provides the electric energy necessary to support the primary building 103 load 131.

The shed structure 101 is a shed. The shed is defined elsewhere in this disclosure. The shed structure 101 is an auxiliary building associated with the primary building 103. The shed structure 101 is a prefabricated building. The shed structure 101 is delivered to the site of the primary building 103 such that the power circuit 102 is already installed within the power circuit 102. The shed structure 101 forms a chamber. The chamber formed by the shed structure 101 forms a protected space that contains the power circuit 102. The shed structure 101 comprises a pitched roof 111 and a shed protected space 112.

The shed protected space 112 is a protected space that is enclosed by the shed structure 101. The shed protected space 112 forms the space used to contain the bulk of the power circuit 102. The pitched roof 111 is a roof used to enclose the upper boundary of the shed protected space 112.

The power circuit 102 is an electric circuit. The power circuit 102 electrically connects to the primary building 103 load 131. The power circuit 102 is a source of ac electric energy used to power the primary building 103 load 131. The power circuit 102 forms an electrical connection with the primary building 103 load 131. The power circuit 102 is an electrochemical device. The power circuit 102 converts chemical potential energy into the electrical energy required to power the primary building 103 load 131. The power circuit 102 is an independently powered electric circuit. By independently powered is meant that the power circuit 102 can operate without an electrical connection to an external power source such as the national electric grid 126.

The power circuit 102 comprises a battery 121, a diode 122, a photovoltaic cell 123, an inverter circuit 124, a switching circuit 125, and a national electric grid 126. The battery 121, the diode 122, the photovoltaic cell 123, the inverter circuit 124, the switching circuit 125, and the national electric grid 126 are electrically interconnected. The photovoltaic cell 123 of the power circuit 102 mounts on the exterior surface of the pitched roof 111 such that the photovoltaic cell 123 has direct access to the sun.

The battery 121 is an electrochemical device. The battery 121 converts chemical potential energy into the electrical energy used to power the power circuit 102. The battery 121 is a commercially available rechargeable battery 121. The photovoltaic cell 123 is an electrical device that converts light into electrical energy. The chemical energy stored within the rechargeable battery 121 is further renewed and restored through use of the photovoltaic cell 123. The photovoltaic cell 123 is directly wired to the battery 121. The photovoltaic cell 123 is an electrical circuit that reverses the polarity of the rechargeable battery 121 and provides the energy necessary to reverse the chemical processes that the rechargeable battery 121 initially used to generate the electrical energy. This reversal of the chemical process creates a chemical potential energy that will later be used by the rechargeable battery 121 to generate electricity. The diode 122 is an electrical device that allows current to flow in only one direction.

The diode 122 installs between the rechargeable battery 121 and the photovoltaic cell 123 such that electricity will not flow from the first positive terminal of the rechargeable battery 121 into the second positive terminal of photovoltaic cell 123. The photovoltaic cell 123 is defined elsewhere in this disclosure.

The inverter circuit 124 is an electric circuit. The inverter circuit 124 forms an electric connection with the battery 121. The inverter circuit 124 draws dc electric energy from the battery 121. The inverter circuit 124 electrically connects to the switching circuit 125. The inverter circuit 124 converts the received dc electric energy into an electric energy suitable for use in powering the primary building 103 load 131. The inverter circuit 124 provides the ac electric energy to the switching circuit 125. In the first potential embodiment of the disclosure, the inverter circuit 124 is selected from the group consisting of: a) an inverter, and, b) a grid tie inverter. The choice of inverter circuit 124 is a function of the requirements of the primary building 103 load 131.

The switching circuit 125 is an electric circuit. The switching circuit 125 electrically connects to the battery 121. The switching circuit 125 electrically connects to the national electric grid 126. The switching circuit 125 electrically connects to the primary building 103 load 131. The switching circuit 125 transfers ac electric energy to the primary building 103 load 131 from an electric energy source selected from the group consisting of: a) the battery 121 and the national electric grid 126. In the first potential embodiment of the disclosure, the switching circuit 125 is an automatic transfer switch. The automatic transfer switch is defined elsewhere in this disclosure.

The national electric grid 126 is an externally provided source of electric energy. The national electric grid 126 is defined elsewhere in this disclosure.

The following definitions were used in this disclosure:

AC: As used in this disclosure, AC is an acronym for alternating current.

Alternative Electric Power Source: In this disclosure, an alternative electric power source is an external electric power source that uses wind, solar power, or a naturally occurring temperature gradient (such as geothermal structures or the use of the ocean's thermal gradient) as its energy source.

Automatic: As used in this disclosure, automatic refers to a device, process, or a system that operates without human control, supervision, or participation in the operation of the device, process, or system. The verb form of automatic is to automate.

Automatic Transfer Switch: As used in this disclosure, the automatic transfer switch is a switching circuit. The automatic transfer switch provides electric energy to a load from a source selected from the group consisting of a primary source of electric energy and a backup source of electric energy. The primary source of electric energy is usually the national electric grid. The backup source of electric energy is usually selected from the group consisting of a generator or a battery powered device. The automatic transfer switch: a) monitors the availability of electric energy from the primary source of electric energy; b) transfers electric energy from the primary source of electric energy to the load when the automatic transfer switch determines that the primary source of electric energy is available and functioning properly; and, c) transfers electric energy from the backup source of electric energy to the load when the automatic transfer switch determines that the primary source of electric energy is not available or not functioning properly. The automatic transfer switch is an automatic device. By automatic is meant that the automatic transfer switch can switch between the primary source of electric energy and the backup source of electric energy without human control, supervision, or participation in the process. The automatic transfer switch is abbreviated ATS.

Barrier: As used in this disclosure, a barrier is a physical obstacle that forms a boundary between a first space and a second space. The barrier prevents the passage of an object between the first space and the second space.

Battery: As used in this disclosure, a battery is a chemical device consisting of one or more cells, in which chemical energy is converted into electricity and used as a source of power. Batteries are commonly defined with a positive terminal and a negative terminal.

Building: As used in this disclosure, a building is a structure located a fixed position that forms one or more enclosable spaces. The building forms a space selected from the group consisting of a protected space or a protection space. A building is often referred to as a structure.

Chamber: As used in this disclosure, a chamber is an enclosed or enclosable space within a building.

Control Circuit: As used in this disclosure, a control circuit is an electrical circuit that manages and regulates the behavior or operation of a device.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Electrical Ground: As used in this disclosure, an electrical ground is a common reference voltage that is used in the design and implementation of electrical circuits. An electrical ground is often, but not necessarily, the discharge point of electric currents flowing through an electric circuit.

External Power Source: As used in this disclosure, an external power source is a source of the energy that is externally provided to enable the operation of the present disclosure. Examples of external power sources include, but are not limited to, electrical power sources and compressed air sources.

Grid Tie Inverter: As used in this disclosure, a grid tie inverter is an electric device that converts dc electricity into ac electricity that is synchronized with a national electric grid.

Inverter: As used in this disclosure, an inverter is an electrical device that converts a DC voltage into an AC voltage. Methods to design and build inverters are well known in the electrical arts. An inverter is also known as a frequency generator.

National Electric Grid: As used in this disclosure, the national electric grid is a synchronized and highly interconnected electrical network that distributes energy in the form of electric power from a plurality of generating stations to consumers of electricity. The national electric grid is a commercially available source of AC electrical power. The national electric grid is regulated by an appropriate authority. The national electric grid comprises one or more utilities that sell electrical power for use by an electrical load. The national electric grid invoices for electrical power based on the total energy consumed by the electrical load. The national electric grid measures the energy consumption of an electrical load with an electrical meter. The national electric grid provides power through electrical connections known as a hot lead and a neutral lead.

Negative Space: As used in this disclosure, negative space is a method of defining an object through the use of open or empty space as the definition of the object itself, or, through the use of open or empty space to describe the boundaries of an object.

Photoelectric: As used in this disclosure, photoelectric is an adjective used to describe an electronic component in which the performance of the electronic component is modified by light. Typical photoelectric devices include, but are not limited to, photoelectric transistors, photoelectric diodes, and photoelectric resistors.

Photovoltaic Cell: As used in this disclosure, a photovoltaic cell is a photoelectric device that directly converts light energy into electrical energy.

Pitched Roof: As used in this disclosure; a pitched roof refers to a roof wherein the surface of the roof forms a cant that is not perpendicular to the force of gravity.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Prefabricated Building: As used in this disclosure, a prefabricated building refers to a building that built from subcomponents that are manufactured in a factory. The subcomponents are shipped to the site of the desired location of the building where the subcomponents are assembled to form the building.

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; protects the object within the protected space from potential dangers that are outside of the protected space; or, d) maintaining the privacy of the object within the protected space. Use Barrier Private Roof: As used in this disclosure, a roof is the exterior surface of a structure that is distal from the surface upon which the structure is placed. As used in this disclosure, the exterior surface is assumed to include the supporting structures associated with the exterior surface including, but not limited to, rafters, decking, soffits, and fascia. A pitched roof is a roof wherein the surface of the roof has a cant that is not perpendicular to the direction of gravity.

Shed: As used in this disclosure, a shed is a single chamber building. The chamber forms a protected space used for storing objects.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A shed with integrated solar roof comprising
a shed structure and a power circuit;
wherein the shed structure forms a shed protected space that contains the power circuit;
wherein the shed with integrated solar roof is configured for use with a primary building;
wherein the primary building further comprises a primary building load;
wherein the power circuit electrically connects to the primary building load;
wherein the power circuit is a source of ac electric energy used to power the primary building load;
wherein the power circuit forms an electrical connection with the primary building load;
wherein the power circuit is an electrochemical device that converts chemical potential energy into the electrical energy required to power the primary building load.

2. The shed with integrated solar roof according to claim 1
wherein the shed with integrated solar roof is a prefabricated building;

wherein the shed with integrated solar roof is an alternative electric power source;
wherein the primary building load is the requirement for the amount of electric energy necessary to support the operation of the electrically powered devices in the primary building;
wherein the power circuit provides the electric energy necessary to support the primary building load.

3. The shed with integrated solar roof according to claim 2
wherein the shed structure is an auxiliary building associated with the primary building;
wherein the shed structure forms a chamber.

4. The shed with integrated solar roof according to claim 3
wherein the shed structure comprises a pitched roof and a shed protected space;
wherein the shed protected space is a protected space that is enclosed by the shed structure;
wherein the shed protected space forms the space used to contain the bulk of the power circuit;
wherein the pitched roof is a roof used to enclose the upper boundary of the shed protected space.

5. The shed with integrated solar roof according to claim 4
wherein the power circuit is an independently powered electric circuit;
wherein by independently powered is meant that the power circuit can operate without an electrical connection to an external power source.

6. The shed with integrated solar roof according to claim 5
wherein the power circuit comprises a battery, a diode, a photovoltaic cell, an inverter circuit, a switching circuit, and a national electric grid;
wherein the battery, the diode, the photovoltaic cell, the inverter circuit, the switching circuit, and the national electric grid are electrically interconnected.

7. The shed with integrated solar roof according to claim 6 wherein the photovoltaic cell of the power circuit mounts on the exterior surface of the pitched roof such that the photovoltaic cell has direct access to the sun.

8. The shed with integrated solar roof according to claim 7
wherein the battery is a rechargeable battery;
wherein the photovoltaic cell is an electrical device that converts light into electrical energy;
wherein the photovoltaic cell is directly wired to the battery;
wherein the photovoltaic cell is an electrical circuit that reverses the polarity of the rechargeable.

9. The shed with integrated solar roof according to claim 8
wherein the diode is an electrical device that allows current to flow in only one direction;
wherein the diode installs between the rechargeable battery and the photovoltaic cell such that electricity will not flow from the rechargeable battery into the photovoltaic cell.

10. The shed with integrated solar roof according to claim 9
wherein the inverter circuit is an electric circuit;
wherein the inverter circuit forms an electric connection with the battery;
wherein the inverter circuit draws dc electric energy from the battery;
wherein the inverter circuit electrically connects to the switching circuit;
wherein the inverter circuit converts the received dc electric energy into an electric energy suitable for use in powering the primary building load;
wherein the inverter circuit provides the ac electric energy to the switching circuit.

11. The shed with integrated solar roof according to claim 10
wherein the switching circuit is an electric circuit;
wherein the switching circuit electrically connects to the battery;
wherein the switching circuit electrically connects to the national electric grid;
wherein the switching circuit electrically connects to the primary building load;
wherein the switching circuit transfers ac electric energy to the primary building load from an electric energy source selected from the group consisting of: a) the battery and the national electric grid.

12. The shed with integrated solar roof according to claim 11 wherein the national electric grid is an externally provided source of electric energy.

* * * * *